3,194,852
PRODUCTION OF URANIUM OXIDE BODIES
Henry Lloyd, Wantage, Neville Ronald Williams, Harwell, and Christopher Cameron Hope Wheatley, West Hanney, near Wantage, England, assignors to United Kingdom Atomic Energy Authority, London, England
No Drawing. Filed June 16, 1960, Ser. No. 36,467
Claims priority, application Great Britain, June 22, 1959, 21,393/59
9 Claims. (Cl. 264—21)

The invention relates to the production of uranium oxide bodies, and is particularly concerned with the production of bodies of both stoichiometric and non-stoichiometric uranium dioxide of high density, suitable for use as fuel material in nuclear reactors.

Non-stoichiometric uranium dioxide is to be understood as an oxide of uranium in which the ratio of oxygen atoms to uranium atoms lies between 2.05 and 2.33. Stoichiometric uranium dioxide is to be understood as an oxide of uranium in which the ratio of oxygen atoms to uranium atoms is substantially 2, or may be slightly greater than 2, but is less than 2.05.

Dense bodies of stoichiometric uranium dioxide can be produced by cold-compacting stoichiometric uranium dioxide powder and sintering at 1600° to 1700° C. in an inert gas, such as argon, or in hydrogen. Such bodies, however, have been found to show a non homogeneous structure and to suffer lamination when subjected to grinding or other machining processes.

According to British patent specification No. 801,381, dense bodies of non-stoichiometric uranium dioxide can be produced by cold-compacting a non-stoichiometric uranium dioxide powder, in which the ratio of oxygen atoms to uranium atoms lies between 2.09 and 2.15, and sintering at about 1400° C. in an inert atmosphere. Such bodies can be converted to bodies of stoichiometric uranium dioxide by further heating at a temperature above 1000° C. in a reducing atmosphere, e.g. at 1200° C. in a hydrogen-containing atmosphere.

An object of the present invention is to provide compacted bodies of non-stoichiometric uranium dioxide suitable for sintering to produce stoichiometric or non-stoichiometric uranium dioxide bodies of high density. According to British patent specification No. 801,381 non-stoichiometric uranium dioxide powder is produced by controlled oxidation of stoichiometric $UO_2$ or by partial reduction of $U_3O_8$, the powder is cold-compacted, and is then sintered, preferably at 1400° C., in an inert atmosphere. The products of this process tend, however, to show lack of homogeneity and to suffer lamination when machined.

According to the present invention, a method of producing a non-stoichiometric uranium dioxide body, suitable for sintering to yield a high-density uranium dioxide body, comprises cold compacting a mixture of stoichiobody, comprses cold compacting a mixture of o stoichiometric or non-stoichiometric uranium dioxide powder, in which the ratio of oxygen atoms to uranium atoms is less than 2.3, and an organic binding agent, and then heating the mixture to a temperature in the range of 200° C. to 250° C. in an oxidising atmosphere, until the ratio of oxygen atoms to uranium atoms in the mixture is raised to at least 2.3.

Such bodies may then be sintered in an inert atmosphere at a temperature of 1300° C. to 1500° C. to yield dense bodies of non-stoichiometric uranium dioxide. They may subsequently be heated at a temperature above 1000° C. in a reducing atmosphere, e.g. hydrogen, to yield dense bodies of stoichiometric uranium dioxide. Alternatively, the bodies may be sintered directly in hydrogen at a temperature of at least 1500° C. to yield dense bodies of stoichiometric uranium dioxide in a single step.

Preferably, the uranium dioxide powder is mixed with sufficient of a solution or dispersion of the binding agent in a volatile liquid to convert the powder into a granular material, which is then dried by heating to volatilise the liquid. The granular material is then cold-compacted at a pressure which produces a uniform body, free from granular structure. We have found that a pressure of 20 to 30 tons per square inch is necessary to achieve this, according to the type of press used. An automatic press having a short "dwell" time at pressure, generally makes the higher pressure necessary. Compacts produced at such pressures have densities of more than 6 g./cc.

Heating to a temperature of 200° to 250° C. in an oxidising atmosphere removes a large part of the organic binder and at the same time oxidises the uranium dioxide to a non-stoichiometric composition in which the ratio of oxygen atoms to uranium atoms has risen to at least 2.3. Heating at 245° C. to 250° C. in air raises this ratio to 2.33. We have found that the rate of heating must be slow to prevent cracking of the compact during binder removal or during subsequent sintering, and, to this end, the rate of heating should preferably not at any time exceed 35° C. per hour between 100° C. and 250° C. We have found that for most sizes of compact, an average heating rate of not more than 17° C. per hour within this range prevents cracking. The compacts should be held at the final temperature of 200° to 250° C. for several hours. A period of 14 to 16 hours at 245° to 250° C. has been found suitable. At the end of such a period of heating, at least 80% of the binder is found to have been removed.

There are many suitable organic binder materials, which may be employed as solutions or dispersions, in organic or aqueous liquids. Suitable binders include water-soluble polymers such as polyethylene glycol, polyacrylic acid or polyvinyl alcohol, polymers soluble in organic liquids, such as polyvinyl esters and polymethacrylate esters, and comparatively insoluble materials, such as paraffin wax. The binder composition may also include a plasticiser for the polymer, such as glycerol or dibutylphthalate.

A particularly suitable binder material is polybutyl methacrylate plasticised with dibutyl phthalate. This may be used as a dispersion, or as a solution in an organic solvent. Suitable solvents include toluene, acetone, methyl ethyl ketone, trichloroethylene and carbon tetrachloride, singly or in admixture. The solvent composition will be selected for its volatility and other characteristics, such as non-inflammability.

The proportion of binder material should be such as to give at least 1% of polymer, or plasticised polymer, by weight of the uranium dioxide in order to give a granulatable mixture. Proportions of 1½% to 6% of polybutyl methacrylate plasticised with dibutyl phthalate have been found to ensure the production of homogeneous uranium dioxide bodies cold-compacted from granular material.

Sintering may be carried out in an inert atmosphere, e.g. argon or nitrogen, at 1300° to 1500° C. to give non-stoichiometric uranium dioxide bodies, or in hydrogen at 1500° C. to 1700° C. or above to give stoichiometric uranium dioxide bodies, or in an inert atmosphere at 1300° to 1500° C. followed by further heating at above 1000° C. in a hydrogen-containing atmosphere to give stoichiometric bodies. In all cases, dense bodies are produced, the stoichiometric bodies having an average density of about 10.5 g./cc., which is 96% of theoretical, and the non-stoichiometric bodies having densities of about 10.75 g./cc. and a ratio of oxygen atoms to uranium atoms of from 2.1 to 2.2.

The nature of the invention and other features thereof will be made more clear by the following examples:

*Example I*

250 gms. of uranium dioxide powder, having a ratio of oxygen atoms to uranium atoms of 2.04, was ball-milled for 30 minutes to breakdown large agglomerates. After this treatment the said ratio had increased to 2.055. To the milled powder was added 25 mls. of a solution of 60% (by weight) polybutyl methacrylate (containing about 11% dibutylphthalate as plasticiser) in toluene, and then 25 mls. of methyl ethyl ketone. Mixing was continued for 10 minutes in an open dish, when the mixture became crumbly and was rubbed through a 22-mesh B.S.S. sieve. The sieved mixture was dried in an electric oven for 2½ hours at 70° C., and any remaining fines removed on a 100-mesh B.S.S. sieve shaker. Compacts were prepared by weighing 7.5 gm. lots into a steel die 0.47 inch in diameter and 2 inches long, and double-end pressing at 30 tons/sq. in. with no "dwell" period. Thus 34 compacts were formed, having bulk densities between 6.35 and 6.42 gms./cc. The compacts were then heated in air in an electric oven at such a rate that the temperature of the compacts rose from 10° C. to 30° C. in 2 hours and then rose steadily to 245° C. over the next 8 hours, with a maximum rate of about 35° C. per hour. The temperature was then maintained at 245° C. for 16 hours. After cooling the compacts were found to have shrunk linearly by only 0.002 inch. Analysis of a sample showed that the average ratio of oxygen atoms to uranium atoms therein was 2.33. Seventeen of these compacts were then sintered in an electric furnace in an atmosphere of argon, raising their temperature to 1450° C. at a rate of 350° C. per hour and maintaining the temperature at 1450° C. for one hour. After cooling overnight in argon, the compacts were found to have shrunk linearly by 16.7%, their bulk densities were between 10.75 and 10.8 gm./cc. and the ratio of oxygen to uranium atoms therein was found to be between 2.15 and 2.20.

*Example II*

The remaining 17 compacts from Example I were similarly sintered in argon, but after being maintained at 1450° C. for one hour, they were allowed to cool in argon to 1200° C. The furnace atmosphere was then changed to 30% hydrogen and 70% nitrogen and the temperature maintained at 1200° C. for 2 hours. After being allowed to cool overnight in this atmosphere, the compacts were found to have shrunk linearly by 16.6%, their bulk densities were between 10.42 and 10.58 gm./cc., and the ratio of oxygen to uranium atoms therein was found to be 2.00.

*Example III*

34 compacts were formed as in Example I, and then heated in air in a continuous furnace, the compacts passing the furnace at such a rate that they were heated to 100° C. in 1 hour, then from 100° C. to 250° C. in 9 hours at a linear rate of about 17° C. per hour, and finally at 250° C. for 14 hours. Analysis of a sample showed that the average ratio of oxygen atoms to uranium atoms in the compacts was then 2.33. The compacts were then sintered in a continuous electric furnace in an atmosphere of 30% hydrogen and 70% nitrogen, raising their temperature to 1600° C. at a maximum rate of 275° C. per hour, maintaining it above 1550° C. for 1½ hours, and cooling to room temperature, the whole sintering cycle lasting 24 hours. The compacts were found to have shrunk by 16.5%, their bulk densities were between 10.5 and 10.6 gm./cc. and the ratio of oxygen to uranium atoms therein was found to be between 2.00 and 2.01.

Compacts from Examples I, II and III were machined to accurate dimensions by surface grinding. They showed no signs of lamination or inhomogeneity.

We claim:

1. A method of producing a dense uranium dioxide body, comprising the steps of mixing powdered uranium dioxide having an oxygen to uranium atomic ratio of less than 2.3 with an organic binding agent; cold-compacting the mixture into a body at a pressure of at least 20 tons/sq. in. to yield a compacted body; heating said compacted body to a temperature in the range 200° C. to 250° C. in an oxidising atmosphere until the oxygen to uranium ratio is at least 2.3 and at least a large part of the binding agent is removed; and thereafter heating the body in an inert atmosphere to a temperature of 1300° C. to 1500° C., thereby obtaining a dense non-stoichiometric body.

2. A method according to claim 1, in which the said mixture contains at least 1% of the said binding agent by weight of the said uranium dioxide powder.

3. A method according to claim 2, in which the binding agent is polybutyl methacrylate plasticised with dibutyl phthalate and is present in amount of 1½% to 6% by weight of the said uranium dioxide powder.

4. A method according to claim 1, in which the rate of heating of the compacted body in the said oxidising atmosphere does not at any time exceed 35° C. per hour between 100° C. and 250° C.

5. A method according to claim 4 in which the average rate of heating from 100° C. to 250° C. is not more than 17° C. per hour.

6. A method according to claim 1, in which the compacted body is heated at a temperature of 245° C. to 250° C. for at least 14 hours in the said oxidising atmosphere.

7. A method of producing a dense uranium dioxide body, comprising the steps of mixing powdered uranium dioxide having an oxygen to uranium atomic ratio of less than 2.3 with an organic binding agent; compacting the mixture into a body at a pressure of at least 20 tons/sq. in. to yield a compacted body having a density of at least 6 gm./cc.; then heating said compacted body to a temperature in the range 200° C. to 250° C. in an oxidising atmosphere until the oxygen to uranium ratio is at least 2.3 and at least a large part of the binding agent is removed; subsequently heating said body in an inert atmosphere to a temperature of 1300° C. to 1500° C. and thereafter heating the body in a reducing atmosphere at a temperature of at least 1000° C., thereby producing a dense stoichiometric body.

8. The method of claim 7 in which the final heating step takes place in a hydrogen-containing atmosphere at 1200° C.

9. A method of producing a dense uranium dioxide body, comprising the steps of mixing powdered uranium dioxide having an oxygen to uranium atomic ratio of less than 2.3 with an organic binding agent; cold-compacting the mixture into a body at a pressure of at least 20 tons/sq. in. to yield a compacted body having a density of at least 6 gm./cc.; then heating said compacted body to a temperature in the range 200° C. to 250° C. in an oxidising atmosphere until the oxygen to uranium ratio is at least 2.3 and at least a large part of the binding agent is removed, and thereafter heating the compacted body in hydrogen at a temperature of at least 1500° C.

(References on following page)

References Cited by the Examiner

UNITED STATES PATENTS 3,094,377   6/60   Langrod _____ 23—14.5

FOREIGN PATENTS 801,381   9/58   Great Britain.

OTHER REFERENCES

AEC Document TID-7546, Bk 2, March 1958, pp. 432–439.

AEC Document WAP-PWR-PMM-429 (Del.), March 6, 1956, pp. 4–10.

AEC Document WAPD-PWR-PMM-466 (Del.), June 5, 1956, pp. 5, 6, 42 and 43.

Ceramics, October 1958, pp. 102–103.

CARL D. QUARFORTH, *Primary Examiner.*

ROGER L. CAMPBELL, OSCAR R. VERTIZ,
*Examiners.*